(No Model.)  2 Sheets—Sheet 1.

J. W. LANGLEY.
ELECTRIC REGULATOR.

No. 247,664.  Patented Sept. 27, 1881.

Witnesses:
Edwin Sweetser.
George H. Carlisle.

Inventor:
John W. Langley
by Geo. H. Lothrop
his atty.

(No Model.) 2 Sheets—Sheet 2.

J. W. LANGLEY.
ELECTRIC REGULATOR.

No. 247,664. Patented Sept. 27, 1881.

Witnesses:
Charles B. Lothrop,
Edwin Sweetser.

Inventor:
John W. Langley
by Geo. H. Lothrop
his atty.

UNITED STATES PATENT OFFICE.

JOHN W. LANGLEY, OF ANN ARBOR, MICHIGAN.

ELECTRIC REGULATOR.

SPECIFICATION forming part of Letters Patent No. 247,664, dated September 27, 1881.

Application filed May 2, 1881. (No model.)

*To all whom it may concern:*

Be it known that I, JOHN W. LANGLEY, of Ann Arbor, in the county of Washtenaw and State of Michigan, have invented a new and useful Improvement in Electric Regulators, of which the following is a specification.

Figure 1:
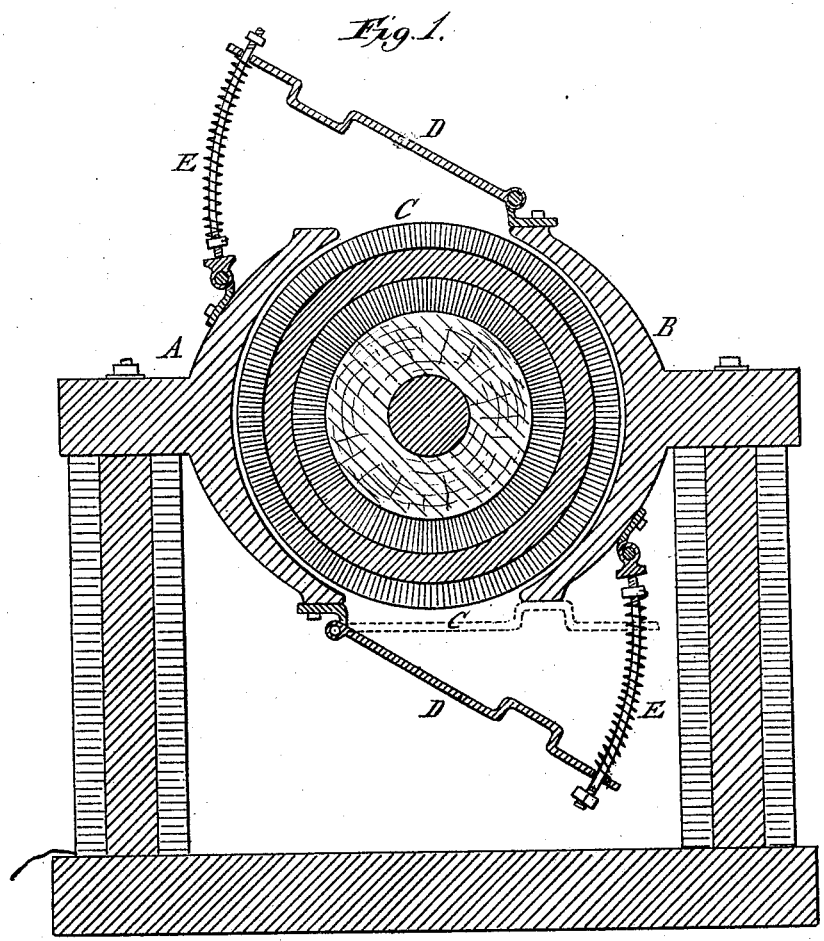
Figure 2:
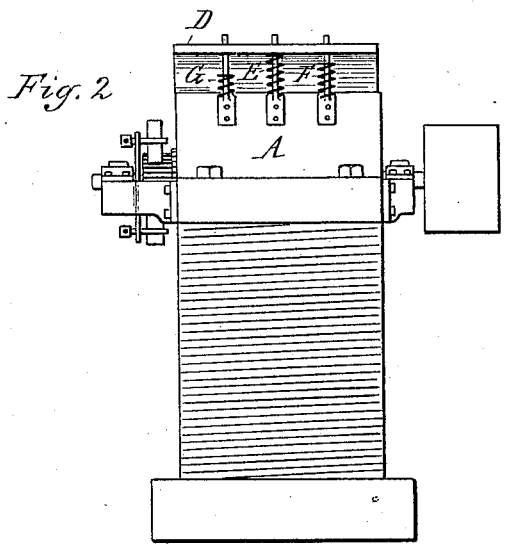

In the accompanying drawings, Figure 1 represents a sectional view through the electro-magnet and armature of a dynamo-electric machine. Fig. 2 is an end view, showing a modification.

A B are the poles of an electro-magnet in a dynamo-electric generator.

C is an armature revolving between poles A B.

D D are pieces of magnetic metal, one of which is hinged at one end to the top of pole B and the other to the bottom of pole A; or they may be both hinged to the top and bottom, respectively, of either of said poles.

E E are springs, of any diamagnetic substance, which are fastened to the poles A B, and are so placed that they will resist any motion of the free ends of pieces D D toward the poles A B. These springs may be set on guide-rods of some diamagnetic substance, as shown in the drawings, or be attached to the poles and free ends of pieces D D in any suitable manner.

As the attraction of the free ends of pieces D D toward poles A B increases in power as said free ends approach said poles faster than the resistance of springs E E increases, shorter supplemental springs may be used, as shown at F and G, Fig. 2, which will increase the resistance of the springs in the same ratio as the magnetic attraction increases; or a system of weights and levers offering variable resistances may be substituted for the springs.

It is well known that the efficiency of a dynamo-electric machine depends upon the amount of free magnetism in the electro-magnet.

If the poles of an electro-magnet be connected by any magnetic substance, the free magnetism in such electro-magnet becomes greatly diminished, the magnetism therein becomes bound, and, in proportion as a magnetic connection is more nearly established between the poles of an electro-magnet in a dynamo-electric machine, the amount of free magnetism in such electro-magnet will be diminished and the current produced by such machine weakened. It follows that if, in an electric-lighting system, an excess of current be made to bring a magnetic connection between the poles of the electro-magnet of the generator closer to said poles, the current produced by the generator will be diminished substantially in proportion as such connection approaches said poles, and the electric lamps will be kept steady.

The operation of my invention is as follows: The springs E E are adjusted in any suitable manner (the manner shown in the drawings is by screw-nuts) to such tension that when the generator is producing a current of the strength necessary to operate the system of lights to which the generator is attached the resistance of the springs will equal the attraction of the poles A B upon the pieces D D, and the springs E E will hold the free ends of pieces D D at a fixed distance from poles A B. If the current becomes too strong—as, for instance, by a lamp being extinguished—the magnetic attraction of the poles A B on the free ends of pieces D D is increased, and overcomes the resistance of the springs E E, and the free ends of the pieces D D will be drawn toward the poles A B, thus diminishing the amount of free magnetism in the electro-magnet and weakening the current produced by the generator. When the current is reduced to the point necessary for operating the lamps still lighted the resistance of the springs will equal the magnetic attraction of the poles and hold the free ends of pieces D D at proper distances from the poles A B. If the current becomes too weak, the springs E E will overcome the magnetic attraction of the poles A B upon the free ends of pieces D D, and force said free ends of said pieces D D farther from said poles, thus increasing the amount of free magnetism in said electro-magnet and producing an increase of current.

I do not confine myself to the use of two magnetic pieces, D D, as one only may be used; but I prefer to use two.

My invention may also be applied to the exciting-machine of a magneto-electric lighting system.

Having thus described my invention, what I claim as new, and desire to secure by Letters Patent, is—

1. The combination, with the poles of the electro-magnet of a dynamo or magneto electric machine, of a magnetic metal piece and mechanism sustaining the same in such relation to the poles of the electro-magnet that an excess of current will cause the poles to attract the magnetic metal piece and tend to establish magnetic communication between the poles through said magnetic metal piece, substantially as and for the purpose described.

2. The combination, with the poles of the electro-magnet of a dynamo or magneto electric machine, of a magnetic metal piece connected at one end with one of the poles, and mechanism for sustaining the other end of the magnetic metal piece at a distance from the other pole in such relation thereto that an excess of current will cause the pole to attract and swing the magnetic metal piece and tend to establish magnetic communication between the poles, substantially as described.

3. The combination of the poles A B of the electro-magnet of a dynamo or magneto electric machine with the movable magnetic piece or pieces D, and diamagnetic springs E or their equivalent, all constructed, arranged, and operating substantially as herein described.

4. The combination, with the poles of the electro-magnet of a dynamo or magneto electric machine, of a magnetic metal piece connected at one end with one of the poles, and a spring sustaining said magnetic metal piece in such relation to the other pole that an excess of current will cause the pole to attract the same and tend to establish magnetic communication between the poles through the magnetic metal piece, substantially as described.

JOHN W. LANGLEY.

Witnesses:
WM. H. PETTEE,
H. D. BENNETT.